2,780,031

METHOD FOR IMPROVING ARABLE SOIL

Louis D. Bryant, Indianapolis, Ind., assignor of one-third each to Robert B. Ellsworth and William H. Borland, Indianapolis, Ind.

No Drawing. Application March 15, 1955,
Serial No. 494,560

5 Claims. (Cl. 47—58)

This invention relates to soil conditioners, and more particularly to a method of improving the physical state of arable soil.

It is well known that certain soils are easily compacted and tend to form hard aggregates which are difficult to break up. Such soils fail to hold water and are readily dried out during dry seasons, and the growth of plants in such soil inhibited and cultivation of crops is made difficult. This is particularly true of soils containing a high percentage of clay, which forms such a hard, packed crust that the spread of plant roots is retarded and the penetration of moisture from rainfall is prevented. For this reason clay soils are particularly subject to erosion, since the water from rainfall is forced to run off rather than being able to soak in.

Heretofore, various expedients have been employed for the purpose of improving the physical consistency, or "tilth" of soils. Addition to clayey soils of sand or expanded mica, peat moss, straw, corn cobs and the like have been proposed, but have failed to fully solve the problem in a satisfactory or permanent way. Recently, the use of synthetic resins, such as the polyacrylonitriles, has been recommended for this purpose, and their use has been followed with a high degree of success. However, these resin preparations are relatively costly. The problems involved in improving soil are clearly set forth in United States Patents 2,652,379 and 2,658,824.

It is an object of this invention to provide a soil conditioning agent which will improve the physical condition of arable soil at relatively low cost and with high efficiency.

Another object of the invention is to provide a method for improving arable soil by the use of an inexpensive and readily available agent which is substantially permanent when incorporated into the soil.

Further objects will be apparent from the disclosure hereinafter made.

I have discovered that the physical condition of arable soil can be improved by incorporating therein finely divided precipitated, hydrated tricalcium silicate. When the said finely divided precipitated hydrated tricalcium silicate is mixed with hard clay-like soil, it changes the consistency of the soil to a loose, loam-like consistency. The soil does not pack and crust thereafter, but becomes crumbly and is readily broken up. When so treated, the soil is readily penetrated by and holds rain water and moisture. The texture of the soil appears to be more porous and the growth of plants therein is facilitated.

Additionally, by the use of my novel method for improving arable soil, the soil is "sweetened" because the agent I employ has a slightly alkaline reaction, although it is substantially insoluble in water. Further, soil so treated resists erosion, and growth of bacteria in soil so treated appears to be promoted.

The finely divided precipitated hydrated tricalcium silicate which I use in my new method for improving arable soil is prepared by known methods, and is available in the trade under the name "Silene." The particle size which I find to be useful ranges from an average of about 0.01 micron upwards to about 1 micron. Such particles are known to possess large surface area; for example, particles averaging 0.03 micron in size have a surface area of about 80 square meters per gram.

In carrying out my new process for conditioning soil, the finely divided, precipitated hydrated tricalcium silicate is mixed with soil in amount of about 1 to about 10%. If desired, the agent is employed as such, or inert materials, such as chopped tobacco stems, sawdust, ground gypsum, wood flour, or other fibrous or inert materials, can be used in admixture with the finely divided, precipitated hydrated calcium trisilicate to assist in distributing it throughout the soil.

The following examples will more specifically illustrate the process of my invention:

*Example 1*

Clay soil, 90 parts, was thoroughly mixed with 10 parts of precipitated hydrated tricalcium silicate having average particle size 0.03 micron.

Samples of the mixture thus prepared were repeatedly wet and then dried in an oven at 37° C. After five such cycles of wetting and drying, the treated soil was friable and of a porous consistency. As a control procedure, samples of the same soil, but untreated, were subjected to the same treatment. After 5 cycles of wetting and oven drying, the untreated control soil was caked hard and very difficult to break up.

*Example 2*

Precipitated, hydrated tricalcium silicate having average particle size about 0.03 micron was spread over clayey garden soil at the rate of about five pounds per 100 square feet. The tricalcium silicate was worked into the upper six inches of the soil with the usual rotary tilling equipment. After treatment and when the ground dried after a rain, the soil was of a loose, easily pulverized consistency.

As noted hereinabove, the calcium silicate which I employ as a soil conditioner can be prepared by methods heretofore available in the art. Thus, the procedure for preparing calcium silicate set forth in the specification of United States Patent 2,287,700 can be utilized. In that patent there is described the preparation of tricalcium silicate by the addition of soluble calcium salts to aqueous solutions of soluble silicates, in such proportions that an insoluble calcium silicate is produced including ratios of $SiO_2$ to $CaO$ of 3 or above. For use in the compositions of my invention, I employ such tricalcium silicates in which the ratio of $SiO_2$ to $CaO$ is about 3.0 to about 3.4. Generally speaking, in referring to precipitated hydrated tricalcium silicate throughout this specification, I intend this term to mean a calcium silicate prepared by precipitation from an aqueous solution of a soluble calcium salt by interaction with a suitable soluble silicate as described in the aforesaid Patent 2,287,700, and in which the ratio of $SiO_2$ to $CaO$ is maintained above about 3.

The following is illustrative of the preparation of the tricalcium silicates useful herein:

An aqueous solution containing 100 g. per liter of calcium chloride is thoroughly mixed with an aqueous solution containing sodium silicate having the formula $$Na_2O(SiO_2)_{3.36}$$

at a temperature of about 25° C. The sodium silicate solution contains about 100 g./liter $SiO_2$. The mixture is agitated vigorously for about 45 minutes, and the precipitated tricalcium silicate is recovered by filtration, washed with water and dried at about 105° C. The dried product is pulverized and screened to have an average particle size of about 0.03 micron, and the ratio of $SiO_2$ to $CaO$ in the product is about 3.36.

The invention claimed is:
1. The method of improving arable soil which comprises incorporating into soil in intimate admixture therewith from about 5 to 15% by weight of precipitated hydrated tricalcium silicate, the average particle size of which lies in the range of from 0.01 to 1 micron.
2. The method of improving arable soil which comprises incorporating into the soil from about 5 to 15% by weight of precipitated hydrated tricalcium silicate having an average particle size of about 0.03 micron.
3. The method of improving arable soil which comprises incorporating into the soil about 10% by weight of precipitated hydrated tricalcium silicate having an average particle size of about 0.03 micron.
4. The method of improving arable soil which comprises incorporating into the soil from about 5 to 15% by weight of finely divided precipitated hydrated tricalcium silicate in which the ratio of $SiO_2$ to CaO is about 3 to 3.4.
5. The method of improving arable soil which comprises incorporating into the soil about 10% by weight of precipitated hydrated tricalcium silicate in which the ratio of $SiO_2$ to CaO is above about 3 and having a particle size of about 0.03 micron.

References Cited in the file of this patent
UNITED STATES PATENTS
1,518,566    Cowles ---------------- Dec. 9, 1924

OTHER REFERENCES

Chemical Abstracts, vol. 24, published 1930, page 2225, "The Neutralizing Action . . ."
Chemical Abstracts, vol. 30, published 1936, col. 1498, "Calcium Silicate Slags."
Chemical Abstracts, vol. 35, published 1941, col. 255, "Nature and Liming Value . . ."